Sept. 15, 1964     H. HURWITZ, JR     3,149,251
ELECTRIC POWER GENERATION
Filed April 17, 1961
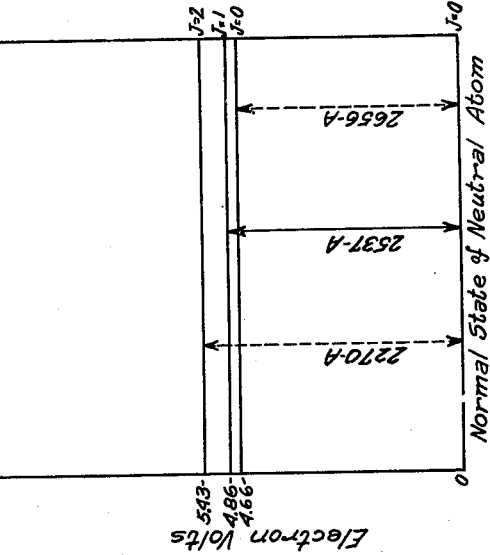
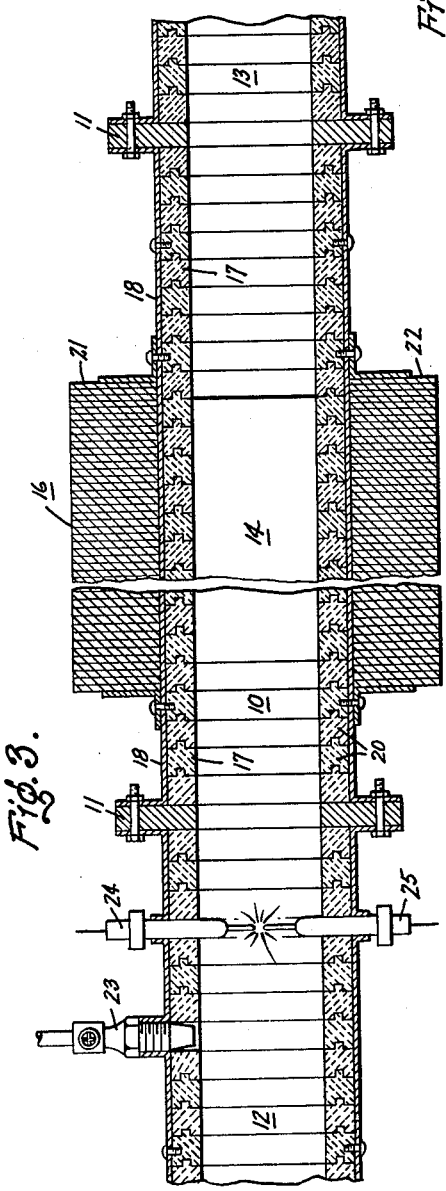
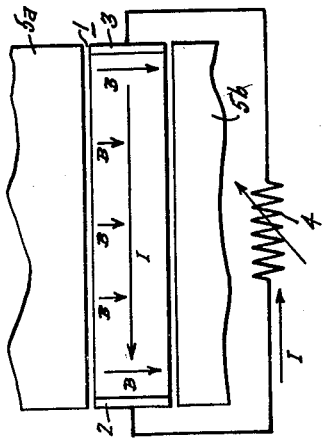
Inventor
Henry Hurwitz, Jr
by Paul A. Frank
His Attorney

United States Patent Office

3,149,251
Patented Sept. 15, 1964

3,149,251
ELECTRIC POWER GENERATION
Henry Hurwitz, Jr., Schenectady, N.Y., assignor to General Electric Company, a corporation of New York
Filed Apr. 17, 1961, Ser. No. 103,303
8 Claims. (Cl. 310—11)

This invention relates to a method and apparatus for generating electric power, and, more particularly, to an improved method and apparatus for generating electric power by the interaction of a moving conducting fluid and a magnetic field.

Conventional rotating devices for generating electricity are based on the principle of first converting heat energy to rotational mechanical energy, typically in a prime mover such as a steam turbine, and then converting the mechanical energy into electrical energy by driving a metallic conductor through a magnetic field. For economical operation of such turbine powered generating systems, high thermal conversion efficiencies in the steam turbine are imperative. The various improvements in turbine efficiencies that have been effected in the past have been achieved by operating at ever higher temperatures and pressures. As these rise, the problems they generate multiply so rapidly that a limit is quickly reached in what may be accomplished by further increases in operating temperatures and pressures. Probably the greatest difficulties arise in the materials area, since the mechanical stresses on moving parts such as turbine blades, shafts, etc., become progressively more severe as operating temperatures and pressures increase. Consequently, a "diminishing returns" effect has set in and improvements in efficiency have been achieved in smaller and smaller increments and at higher and higher costs. Many of these difficulties can be avoided and radical improvements in conversion efficiencies can be effected by completely eliminating those elements which limit performance and devising a system that does not have any moving mechanical components.

To this end, it has been proposed to generate electricity by abstracting energy from a moving conducting fluid, preferably a gaseous one, as it passes through a magnetic field without employing rotating or moving parts merely by impressing a pressure difference on the fluid. Mechanical prime movers, such as turbines are, therefore, no longer necessary and a generating system without any moving parts is feasible. The body of scientific knowledge dealing with the interaction of a conducting gaseous fluid with a magnetic field is commonly known as magnetohydrodynamics (usually abbreviated to MHD) and all subsequent references in this specification to the generation of electrical power by the interaction of a conducting fluid and a magnetic field will be to magnetohydrodynamic generation or MHD generation.

A typical example of an MHD generating system as conceived by previous workers in the field is described in detail in Patent No. 1,717,413, issued June 18, 1929, to R. Rudenberg, which contemplates bringing a gas stream to a conducting condition by heating it to a temperature at which it becomes partially ionized. The ionized gas stream is driven through a magnetic field by a pressure difference, causing an electromotive force (E.M.F.) to be generated in the gas. Under the influence of this E.M.F. such charged particles as are present in the gas are deflected to a pair of electrodes causing a unidirectional or direct current to flow through an external load circuit connected to the electrodes.

An alternating current MHD generator is described in the copending application of Emmeth A. Luebke, Serial No. 39,590, filed June 29, 1960, and assigned to the assignee of the present invention. In that device the conducting gaseous medium is driven along an annular path through a varying radial magnetic field and the interaction of the moving conducting medium with the varying magnetic field produces a circulating current within the conducting medium itself. The circulating current induces a time varying output electromotive force in an output coil wound around the flow path.

Both of these types of MHD generating systems are characterized by difficult maintenance problems, because of the rugged environment to which the construction material is exposed. The electrodes and confining walls for the conducting gaseous medium are exposed to temperatures of several thousand degrees Kelvin, which are necessary to obtain the required ionization of the gas. Thus far, it has been impossible to increase the power output by increasing the degree of ionization because of the deleterious effect on the electrodes and/or the wall material when the temperature of the gaseous conducting medium is further raised. Therefore, it is a primary object of this invention to provide a method and means by which the power output of magnetohydrodynamic generators may be increased without increasing the temperature of the gaseous conducting medium.

Another object of the invention is to provide a method and means for generating electrical power in an MHD apparatus in which the degree of ionization is not dependent solely upon the temperature to which the gaseous conducting medium is heated.

It is another object of the invention to provide a method and means for increasing the speed of the initial ionization process and maintaining the ionization uniform throughout the volume of the gaseous conducting medium.

Other objects and advantages will become apparent as the description of the invention proceeds.

Before discussing MHD generation according to the principles of this invention, it will be useful to review some pertinent physical properties of gaseous fluids; the conditions under which they become conducting; and the manner in which this conductive condition may be achieved to facilitate interaction with a magnetic field. The basic properties of pure gases or of gas mixtures, such as air, are such that under normal circumstances of temperature and pressure the conductivity of the gas is so low that for all practical purposes the gas is non-conducting and no interaction with a magnetic field is possible. To achieve any significant results, the conductivity of the gaseous fluid must be increased in some manner. The preferred method of enhancing the gas conductivity is by partially ionizing the gas, causing a fraction of the gas molecules to lose one or more electrons. The resulting charged particles are free to drift through the gas and may give rise to current conduction by interaction with a magnetic field.

The gas may be ionized in any one of several ways, as by thermal ionization, electric field ionization, X-ray ionization, etc. Because of the relative ease and effectiveness with which it may be carried out, the preferred method used thus far in MHD generating systems is by thermal ionization, i.e., adding heat energy to the gas until some of the gas molecules lose electrons. The thermal ionization process is, however, severely temperature dependent, and is also a discontinuous phenomenon; i.e., there is a threshold temperature range below which insufficient ionization takes place. The ionization energy, by which is meant the thermal energy increment which must be added to the molecules to initiate ionization and tear loose one or more of its electrons, is quite high for most gases. Common gases, such as air, CO, $CO_2$, as well as noble gases, show no perceptible ionization unless the gas is heated above a threshold temperature of approximately 3500° K. (5800° F.). It will be appreciated that the problems involved in heating the gas to an operating temperature, which must be even higher than the ionization threshold temperature of 3500° K., are substantial both in terms of the magnitude of the effort required to heat the gas and in terms of the problem of finding materials capable of withstanding such temperatures.

Fortunately, these difficulties may be reduced by a technique which substantially lowers the critical threshold temperature for ionization. It has been found that by adding a small amount, in the range of 0.01–1% by volume, of some easily ionizable material, such as an alkaline metal vapor, for example, the threshold ionization temperature is reduced by as much as 40–50%.

For example, by "seeding" clean air through the addition of 1% or less by volume of potassium vapor, the critical ionization threshold temperature is reduced from 3500° K. (5800° F.) to 2000° K. (3600° F.). Cesium (Cs), rubidium (Rb), potassium carbonate ($K_2CO_3$), and cesium carbonate ($CsCO_3$) are additional examples of alkaline metal vapors or compounds which are effective for this purpose.

The actual choice of seed material concentration must be determined by calculation and/or experimental tests for the specific conditions of each MHD generator in accordance with the criteria which are taught by this invention. In most designs of practical interest the ratio of seed material to working gas atomic concentration should be in the range $10^{-4}$ to $10^{-3}$. For a more thorough discussion of electrical conductivity and ionization phenomena, reference is hereby made to the text "Introduction to the Theory of Ionized Gases" by J. L. Delcroix, Interscience Publishers, Inc., New York, 1960.

Briefly stated, the present invention contemplates adding a third component to the gas mixture to increase the initial production of ionization and to maintain the ionization uniform throughout the mixture. The required characteristic of the third component is that it has one or more metastable excited states with excitation energy comparable to the ionization energy of the seed material. Thus, upon collision with an un-ionized atom of seed material, the energy of excitation of the metastable state is transferred to the seed material atom causing it to become ionized.

The novel features which are believed to be characteristic of the invention are set forth in the appended claims. The invention itself, however, together with further objects and advantages thereof, may best be understood by reference to the following description taken in conjunction with the accompanying drawings, in which:

FIGURE 1 is a schematic illustration of a direct current MHD generator useful in understanding the present invention;

FIGURE 2 is a diagram useful in understanding the invention; and

FIGURE 3 is a diagrammatic longitudinal sectional view of a generator constructed in accordance with the invention.

In FIGURE 1, a conventional prior art D.C. MHD arrangement is shown as including an elongated rectangular fluid passage or duct 1, extending into the plane of the paper. Metallic electrodes 2 and 3 are disposed in the duct and are connected to a load circuit which, for simplicity of explanation and illustration, is shown as a simple variable resistance 4. The duct is disposed between the pole pieces 5a and 5b of a suitable magnet. If the direction of gas flow is into the plane of the paper and a magnetic field of constant flux density is applied at right angles to the direction of flow, as illustrated by the arrows labeled B, an E.M.F. is generated in the conducting gas at right angles both to the field and to the direction of flow. This E.M.F. acts on the free electrons in the ionized gas and causes an electron current to flow between electrodes 2 and 3 and through the load 4 in the direction shown by the arrow I. If the direction of gas flow is reversed, the current flow is in the opposite direction.

In magnetohydrodynamic generators, it is known that the amount of current flowing between the electrodes in a direct current device, or the amout of current generated in an output winding in an alternating current device, is dependent upon a number of factors. Among these are the degree of ionization of the gaseous working medium, the strength of the magnetic field applied across the duct, the velocity and density of the gaseous working medium as it passes through the magnetic field, and various parameters of duct and electrode configuration. Until now, it has been presumed that the degree of ionization of the gaseous working medium was dependent strictly upon the temperature to which the medium was heated. This, of course, placed severe demands upon the materials of which the duct and electrodes were constructed, because they were exposed to temperatures of several thousand degrees Kelvin from a gas passing therethrough with a velocity at least equal to that of the speed of sound. As to the other parameters affecting the generation, there are physical limitations on the strength of the magnetic field that may be employed inasmuch as the amount of iron and/or copper required becomes prohibitively large; of course, the velocity of the gaseous conducting medium as it passes through the duct cannot be increased indefinitely, again because of the materials problem.

It is known that atoms may exist in various excited states depending on the amount of energy that they have absorbed. For example, FIGURE 2 illustrates only four of the large number of states to which an atom of mercury may be excited. A normal ionized mercury atom will have absorbed 10.38 electron-volts (e.v.), but the atom may exist in intermediate states where it has absorbed 4.66, 4.86 or 5.43 e.v. It is another characteristic of such atoms that they can normally fall from one excited state to a less excited state, while giving up the difference in energy in the form of light, which may be either in the visible spectrum or outside it. For example, the familiar yellow color of a sodium-vapor arc lamp occurs as the atoms fall from their lowest excited state to their normal unexcited state.

It is also known that changes from an excited state to a less excited state are governed by physical rules. For example, where the orbital momentum of an atom is a vector L that represents the vector sum of all the 1 vectors of its electrons, the total spin moment S of an atom is the vector sum of all the $s$ vectors of the electrons of that atom and the vector sum J of S and L, represents the total angular momentum of the atom, transitions between excited states can take place only where the quantized value of J changes by $+1$, $-1$, or 0 and not between two levels where $J=0$ for both. Thus, in the diagram of FIGURE 2, it is seen that a mercury atom cannot drop from its $J=2$ level to its normal un-ionized or zero state or from its $J=0$ (4.66 e.v.) state to its zero state, but it can drop from its $J=1$ state to its zero state and emit light having a wavelength of 2537 Angstrom units (A.). Furthermore, for another physical reason which prohibits radiative transitions between certain energy levels, a mercury atom cannot by itself drop from its 5.43 e.v. level to its 4.86 e.v. or 4.66 e.v. levels. These levels from which transitions to lower energy levels are prohibited or are relatively unlikely to occur are called metastable levels or states. For a good explanation of energy levels and the various states, reference is made to the book "Gaseous Conductors" by James D. Cobine, published by Dover Publication, Inc., New York, N.Y., 1958, and particularly to Chapter III thereof. The various energy level values set forth herein are taken from that book.

Once an atom is in a metastable level, it must remain there until the atom has an accidental collision with another particle. If an electron having sufficient energy strikes a metastable atom, it may raise the atom that is in the metastable state to a higher energy level from which it can return to the normal state. When atoms of other elements are present, the excess energy of the metastable atom may be given up by exciting or ionizing one of the other atoms. Because the encounters by which a metastable atom can change its energy level are special and relatively unlikely to occur, the average life of a metastable atom is relatively long (e.g., $10^{-3}$ seconds) compared to the average life of an atom in a normal excited state (e.g., $10^{-8}$ seconds).

The present invention contemplates the addition of a third component to the gaseous working medium and seed material, which has one or more metastable excited states with excitation energy comparable to the ionization energy of the seed material. If such a material is incorporated into the gas mixture of the MHD generator, then the metastable states of this material may be excited by impact with existing electrons or by electrons provided by means of a supplemental electric field such as produced by an arc discharge. They will then, with high probability, maintain their excitation until they collide with an unionized seed material atom, whereupon the energy of excitation of the metastable state will be transferred to the seed material atom and cause it to become ionized. Since the cross-section for excitation of metastable states by electron impact is comparable to the cross-section for ionization by electron impact, and since under ideal conditions the formation of one metastable state will lead almost always to the formation of an ion pair, the initial rate of ionization buildup will be increased in proportion to the ratio of third component concentration to seed material concentration. Assuming comparable metastable state excitation and seed ionization cross-sections, the time required for ionization to reach a high level can be reduced by a large factor which varies exponentially with the ratio of ionization potential of the seed material and the temperature of the electrons. Under these circumstances, the appropriate ratio of third component concentration to seed concentration can appropriately also be of this order of magnitude.

Typical combinations of seed material and third component material are cesium as the seed material and mercury, cadmium, or zinc vapor as the third component. Rubidium or potassium as the seed material and mercury vapor as the third component is also a favorable combination since the metastable level excitation in mercury (4.66 e.v.) is comparable but slightly above the ionization potentials of rubidium (4.18 e.v.) or potassium (4.34 e.v.).

A typical over-all atomic composition of the gas mixture would be an admixture of 1% mercury vapor and $10^{-2}$% cesium vapor to helium or other noble gas. This illustrates the preferred region of operation in that the third component concentration is considerably larger than the seed concentration but small compared to the working gas concentration.

An important benefit to be gained from the use of a third component material containing metastable states is that the metastable states of interest generally occur in combination with a state which emits strong resonance radiation. For example, as pointed out with reference to FIGURE 2, in mercury the metastable states are the $J=0$ and $J=2$ members of a triplet, the third member of which is $J=1$ state which emits the resonance line at 2537 A. This resonance radiation allows the mercury excitation energy to be spread out over a relatively large volume since the radiation from one mercury atom is absorbed by other mercury atoms in the gas and then transferred to metastable states of mercury by inelastic collision of mercury atoms and other atoms. This means that the ionization becomes fairly uniform over the volume of the gas, and the formation of narrow arc columns in the gas is thereby inhibited. This resonance radiation does not constitute a serious drain of energy from the system since it is strongly self-absorbed. This distance which energy is transported by the resonance radiation is small compared to the dimensions of the MHD generator duct, but large enough to smooth out local inhomogeneities in the ionization density. This effect, therefore, not only facilitates the initial establishment of a relatively uniform degree of ionization but furthermore aids in maintaining uniformity of ionization throughout the gas as it passes through the MHD generator.

It has been found that once a high degree of ionization has been established in the working gas, that high degree of ionization will tend to persist as the gas proceeds on through the generator even after such time as the electron temperature has fallen below an initial high value. This is because the disappearance of the ionization by recombination of ions and electrons is a relatively slow process and therefore the disappearance of ionization lags behind a diminution in electron temperature. As a result, conditions for the maintenance of a high electron temperature may be to some extent relaxed near the exit end of the generator. This persistence of ionization, which is useful in providing flexibility in engineering design, is further enhanced by the presence of the third component in the gas by virtue of its ability to cause ionization of the seed material through metastable states and by virtue of its ability to spatially distribute electronic excitation energy by resonance radiation as described above.

FIGURE 3 illustrates diagrammatically a direct current MHD generator constructed in accordance with the principles of the invention. Although a direct current generator is illustrated, it is to be understood that the principles of the invention are equally applicable to an alternating current generator.

A flow path for a moving conducting gas is provided by a rectangularly shaped duct 10, which is bolted or otherwise fastened by means of flanges 11 to suitable inlet and outlet conduits 12 and 13, through which the gaseous working medium enters and leaves the duct 10. The duct 10 is also provided with two electrodes 14 (only one of which is shown) made of a suitable conducting material such as carbon, which are located within the magnetic field produced by a magnetic structure 16 and between which the external load (not shown) is connected.

The duct 10 and the conduits 12 and 13 include a high temperature lining 17 fastened to a supporting wall 18 of a non-magnetic material such as stainless steel. The high temperature lining 17 is exposed to the hot flowing gas and must, therefore, be fabricated of a temperature resistant material. Refractory materials such as zirconium oxide, for example, are particularly suitable as lining materials. The melting point of refractories such as zirconium oxide is higher than the operating temperatures in the MHD generator and they do not deteriorate on contact with the hot gases. Many other refractory materials having similar temperature resistant properties are available and may be used in constructing the lining 17. The various thermal coefficients of expansion of the materials are such that substantial linear expansion under expected normal operating temperatures can be anticipated. High temperature lining 17 must, therefore, be constructed to allow for this expansion and is formed of a plurality of small interlocking pieces 20, which have sufficient clearance to accommodate the thermal expansion.

The magnetic assembly 16, referred to previously, is of laminated iron construction and is excited from a suitable energy source to impress a steady magnetic field across the rectangular duct 10 parallel to the planes of the electrodes 14. The assembly 16 includes a field producing winding (not shown) and pole pieces 21 and 22.

The heated conducting gas, which is the working medium of the MHD generator, is brought to the rectangular duct 10 through inlet conduit 12 which communicates with a combustor (not shown) or other source of heat, where the gas is brought to the desired temperature. Before entering the duct 10, the heated gas is seeded with an easily ionizable alkaline metal vapor, such as cesium, potassium, or rubidium, and a third component having one or more metastable energy levels is added to the gaseous mixture. An injector unit, shown generally at 23, is secured to the inlet conduit 12 ahead of the duct 10 and discharges the ionizable seed vapor and the third component into the gas stream through a nozzle or other suitable device.

As previously explained, the third component, such as mercury, cadmium, or zinc vapor, is excited to one of its metastable states where it will, with high probability, remain until it collides with an un-ionized atom of seed material. At that time its energy of excitation will be transferred to the seed material atom causing it to become ionized. The metastable state of the third component may be excited by electron impact from electrons existing in the working gas or by electrons provided by an arc discharge. For example, a pair of electrodes 24, 25 may be provided which extend through suitable insulating bushings into the inlet conduit 12 downstream of the injector unit 23. The electrodes 24, 25 are connected to a suitable source of power (not shown) so that an arc may strike between them to cause the third component to be excited to a metastable state. It then, in turn, ionizes the seed material as the mixture passes into the duct 10 and toward and between the electrodes 14, where current is generated by interaction between the magnetic field and the ionized gaseous mixture.

It is apparent that many modifications may be made by one skilled in the art. For example, separate means may be provided for injecting the seed material and the third metastable component. The arc provided to energize the third component may be eliminated and energization to a metastable level obtained by electron collision or other means.

Although the invention has been illustrated and described as applied to a particular type of direct current magnetohydrodynamic generator, it is equally applicable to all types of MHD generators, such as a Hall type or segmented electrode type of D.C. generator or to all alternating current MHD generators. Furthermore, it may be applied to both open and closed cycle systems. Therefore, the invention is to be considered as limited only by the scope of the appended claims.

What I claim as new and desire to secure by Letters Patent of the United States is:

1. A method of generating electric power, which comprises the steps of injecting an easily ionizable first material into a gaseous fluid, injecting into said gaseous fluid a second material whose atoms have at least one metastable energy level, raising the energy level of atoms of said second material to their metastable level whereby atoms of said first material are ionized by collisions with atoms of said second material in their metastable level, and passing the gaseous fluid mixture through a magnetic field whereby electric current flows through said gaseous mixture.

2. A method of generating electric power, which comprises the steps of injecting an ionizable first material into a gaseous fluid, injecting into said gaseous fluid a second material whose atoms have at least one metastable energy level comparable to the ionization energy level of said first material, raising the energy level of atoms of said second material to their metastable level whereby atoms of said first material are ionized by collisions with atoms of said second material in their metastable level, and passing the gaseous fluid mixture through a magnetic field whereby electric current flows through said gaseous mixture.

3. A method of generating electric power, which comprises the steps of injecting an easily ionizable first material into a gaseous fluid, injecting into said gaseous fluid a second material whose atoms have at least one metastable energy level to which said atoms are raised after injection of said second material into said gaseous fluid, whereby atoms of said first material are ionized by collisions with atoms of said second material in their metastable level, and passing the gaseous fluid mixture through a magnetic field whereby electric current flows through said gaseous mixture.

4. A method of generating electric power, which comprises the steps of injecting an ionizable first material into a gaseous fluid, injecting into said gaseous fluid a second material whose atoms have at least one metastable energy level comparable to the ionization energy level of said first material and to which metastable level said atoms are raised after injection of said second material into said gaseous fluid, whereby atoms of said first material are ionized by collisions with atoms of said second material in their metastable level, and passing the gaseous fluid mixture through a magnetic field whereby electric current flows through said gaseous mixture.

5. In a magnetohydrodynamic generator, the combination comprising means defining a flow path for a gaseous fluid, means for injecting an easily ionizable first material into the gaseous fluid, means for injecting into the gaseous fluid a second material whose atoms have at least one metastable energy level, and means for raising the energy level of atoms of said second material to their metastable level whereby atoms of said first material are ionized by collisions with atoms of said second material in their metastable level.

6. In a magnetohydrodynamic generator, the combination comprising means defining a flow path for a gaseous fluid, means for injecting an ionizable first material into the gaseous fluid, means for injecting into the gaseous fluid a second material whose atoms have at least one metastable energy level comparable to the ionization energy level of said first material, and means for raising the energy level of atoms of said second material to their metastable level whereby atoms of said first material are ionized by collisions with atoms of said second material in their metastable level.

7. In a magnetohydrodynamic generator, the combination comprising means defining a flow path for a gaseous fluid, means for injecting an easily ionizable first material into the gaseous fluid, and means for injecting into the gaseous fluid a second material whose atoms have at least one metastable energy level to which level said atoms are raised in the gaseous fluid, whereby atoms of said first material are ionized by collisions with atoms of said second material in their metastable level.

8. In a magnetohydrodynamic generator, the combination comprising means defining a flow path for a gaseous fluid, means for injecting an ionizable first material into the gaseous fluid, means for injecting into the gaseous fluid a second material whose atoms have at least one metastable energy level comparable to the ionization energy level of said first material and to which metastable level said atoms are raised in the gaseous fluid, whereby atoms of said first material are ionized by collisions with atoms of said second material in their metastable level.

References Cited in the file of this patent

UNITED STATES PATENTS 1,717,413     Rudenberg _____ June 18, 1929

OTHER REFERENCES

Publication: Gaseous Conductors, by J. D. Cobine, published 1958 by McClelland and Stewart, Canada, pages 75 to 77, 93 and 94.

Publication: Magnetohydrodynamics, by Sporn and Kantrowitz, pages 62 to 65; Power, November 1959.